United States Patent Office.

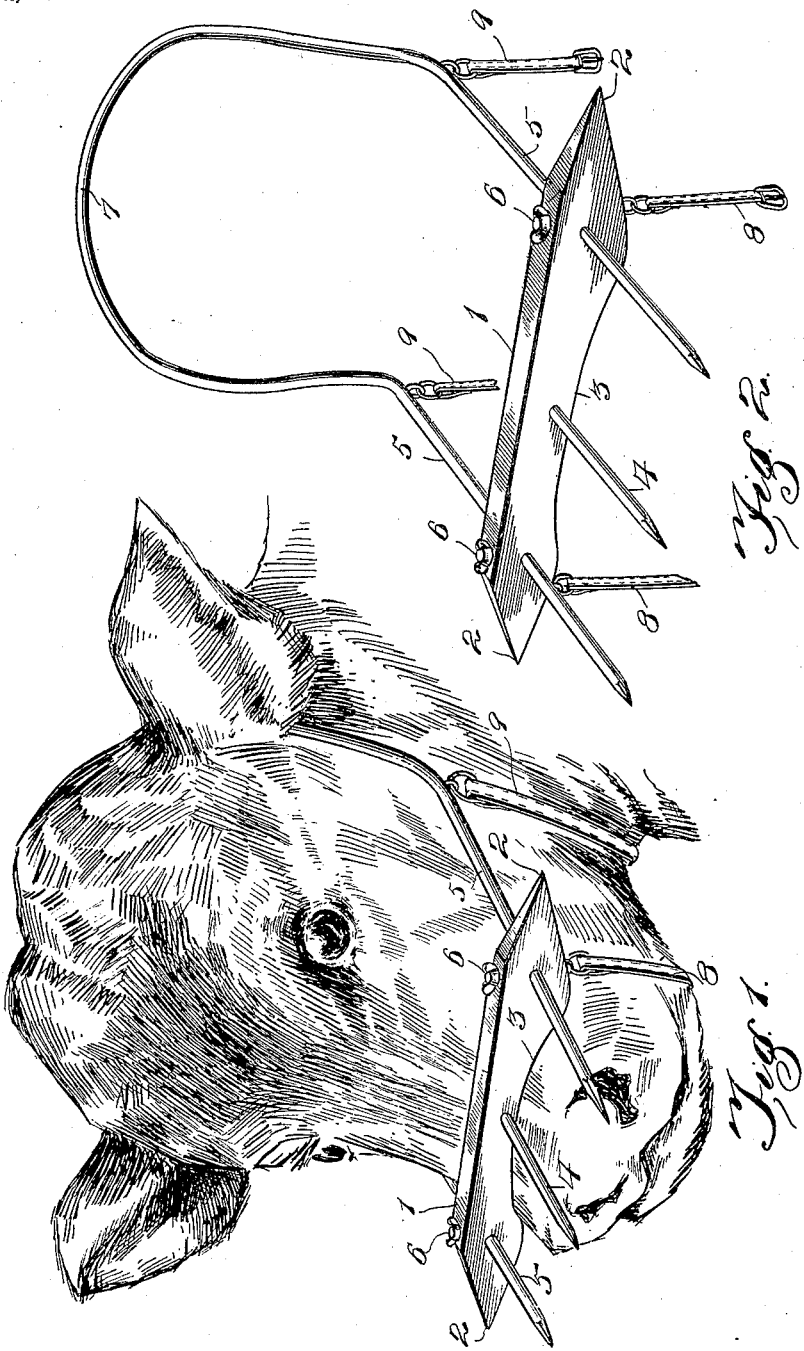

JOHN W. CHAMBERLAIN, OF RICHARDTON, NORTH DAKOTA.

ANIMAL-WEANER.

SPECIFICATION forming part of Letters Patent No. 688,594, dated December 10, 1901.

Application filed March 25, 1901. Serial No. 52,844. (No model.)

*To all whom it may concern:*

Be it known that I, JOHN W. CHAMBERLAIN, a citizen of the United States, residing at Richardton, in the county of Stark and State of North Dakota, have invented a new and useful Animal-Weaner, of which the following is a specification.

This invention relates to animal-weaners, and has for its object to provide an improved device of this character which is arranged for convenient application and removal from the head of an animal and constructed so as to be adjustable for fitting the device properly in place. It is furthermore designed to guard against accidental displacement of the device and also to permit of the animal eating from a receptacle and also grazing.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view illustrating the application of the present device to the head of a calf. Fig. 2 is a detail perspective view of the device removed.

Like characters of reference designate corresponding parts in both figures of the drawings.

In carrying out the invention there is provided a nose-bar 1, preferably formed of wood and having the opposite pointed terminals 2, the intermediate portion of the under side of the bar being concaved or recessed, as at 3, to fit snugly across the bridge of the animal's nose, as shown in Fig. 1. A pointed prong or spur 4 projects forwardly from the middle portion of the bar.

For the support of the nose-bar there is provided a head-frame comprising the opposite straight parallel side bars 5, which have their forward ends pointed to form spurs and also passed loosely through corresponding perforations in the respective end portions of the bar, there being set-screws 6 piercing the upper side of the nose-bar and engaging the respective side bars, so as to provide for the adjustment of the nose-bar longitudinally in opposite directions upon the head-frame. At the rear ends of the side bars there is a neck-yoke 7 rising therefrom and connecting the bars. In practice it is preferred to form the side bars and the neck-yoke from a single metallic rod, which is first bent into substantially U shape, and then the side arms thereof are bent to lie in the same plane at the same side of the bowed portion of the rod and at a little more than a right angle therewith.

To apply the device, the neck-yoke is placed astraddle of the neck of the animal and immediately back of the ears thereof, which prevents the head-frame from working forward, and then the head-frame is swung downwardly until the nose-bar strikes the nose of the animal, after which the bar is adjusted upon the side bars of the frame, so as to properly fit the animal. The nose-straps 8, which are loosely hung from the under sides of the opposite terminals of the nose-bar, are then fastened upon the under side of the animal's nose, and the throat-straps 9, which hang loosely from the rear ends of the head-frame side bars, are buckled under the throat of the animal, whereby the device is conveniently and securely fitted to the animal, with the spurs or prongs projected slightly beyond the mouth thereof. Any suitable means may be provided for fastening the nose and throat straps, although buckles are preferred.

From the foregoing description it will be seen that the present device may be readily applied and removed and when worn by an animal does not worry or interfere with the free movements thereof, nor does it interfere with grazing or eating from a receptacle, while the prongs or spurs will surely prick another animal should the calf attempt to suck.

What is claimed is—

1. An animal-weaner, having a head-frame, comprising opposite side bars, which have their forward ends pointed to form spurs or prongs, and a neck-yoke rising from and connecting the rear ends of the side bars, a nose-bar carried by the side bars and adjustable longitudinally in opposite directions upon the side bars, a nose-strap carried by the nose-bar, and a throat-strap carried by the rear portion of the head-frame.

2. An animal-weaner, having a head-frame formed from a single metallic rod, which is bent into substantially U shape, the outer end portions of the sides thereof being bent forwardly, thereby forming a neck-yoke, and side bars in the same plane and at an angle to the neck-yoke, the terminals of the rod being pointed to form spurs or prongs, a wooden nose-bar, having opposite pointed terminals, and a concaved under side, there being opposite terminal perforations formed through the nose-bar and slidably receiving the respective side bars, set-screws piercing the top of the nose-bar and adjustably engaging the respective side bars, a nose-strap hung from the nose-bar, and a throat-strap hung from the rear end of the head-frame.

3. An animal-weaner, having a head-frame provided with opposite side bars, which have their forward ends pointed to form spurs or prongs, a nose-bar which is adjustable in opposite directions upon the side bars, and a nose-strap carried by the nose-bar.

4. An animal-weaner, having opposite side bars which have their forward ends pointed to form spurs or prongs, a neck-yoke rising from and connecting the rear ends of the side bars, a nose-bar which is adjustable in opposite directions longitudinally upon the side bars, and a nose-strap carried by the nose-bar.

In testimony that I claim the foregoing as my own I have hereto affixed my signature in the presence of two witnesses.

JOHN W. CHAMBERLAIN.

Witnesses:
JOSEPH McCRUM,
JOHN R. JONES.